United States Patent [19]

Agreste, Jr. et al.

[11] Patent Number: 5,107,196

[45] Date of Patent: Apr. 21, 1992

[54] BATTERY BUG

[76] Inventors: William Agreste, Jr., 2415 Lafayette Blvd., Norfolk, Va. 23509; George Spector, 233 Broadway, New York, N.Y. 10007

[21] Appl. No.: 570,730

[22] Filed: Aug. 22, 1990

[51] Int. Cl.⁵ .......................................... H01M 10/46
[52] U.S. Cl. .......................................... 320/2; 320/13
[58] Field of Search .......................... 320/2, 48, 25, 13

[56] References Cited

U.S. PATENT DOCUMENTS

| | | | |
|---|---|---|---|
| 3,534,354 | 10/1970 | Galginaitis | 320/48 X |
| 3,659,183 | 4/1972 | Carlson | 320/25 |
| 4,163,186 | 7/1979 | Haley | 320/2 X |
| 4,238,722 | 12/1980 | Ford | 320/25 |
| 4,617,506 | 10/1986 | Bogie et al. | 320/2 |

Primary Examiner—R. J. Hickey

[57] ABSTRACT

An automatic discharging device is provided and consists of at least one light emitting diode and at least one resistor within at least one electrical wiring discharge circuit in a housing. An alligator clip is connected to each end of the at least one electrical wiring discharge circuit extending from the housing to connect to the terminals of a battery. The at least one light emitting diode will go out when the at least one resistor reaches its desired load indicating that the battery has reached its desired discharged state.

3 Claims, 1 Drawing Sheet

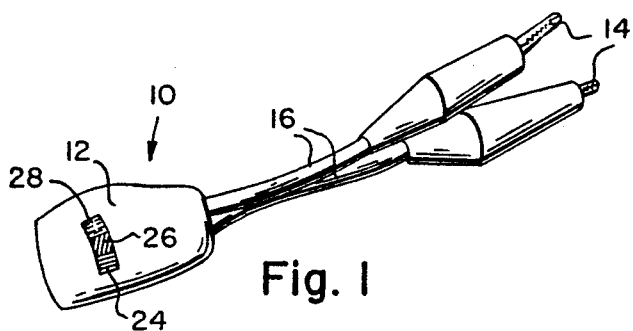
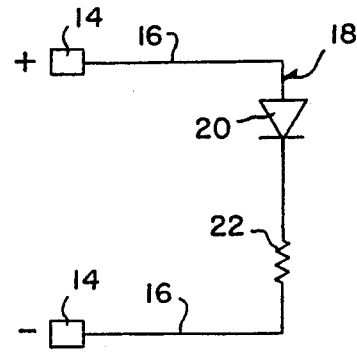
Fig. 1
Fig. 2
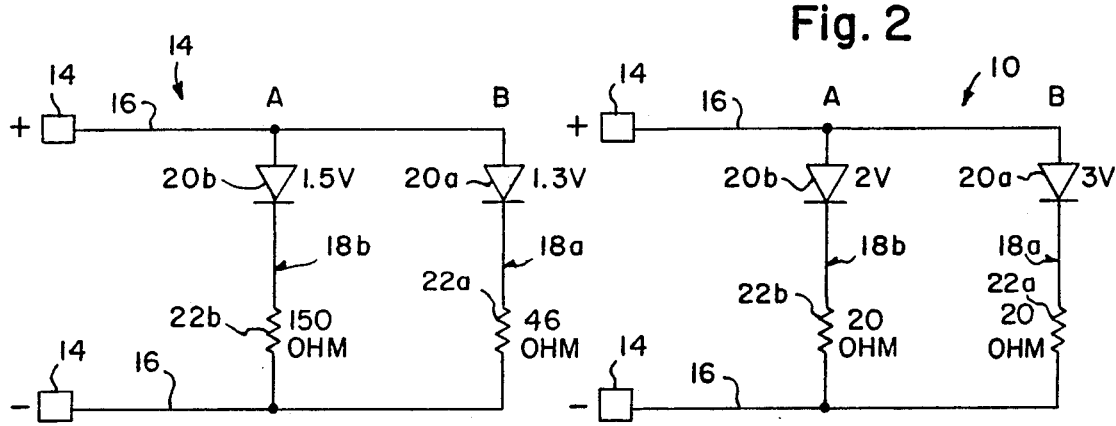
Fig. 3
Fig. 4
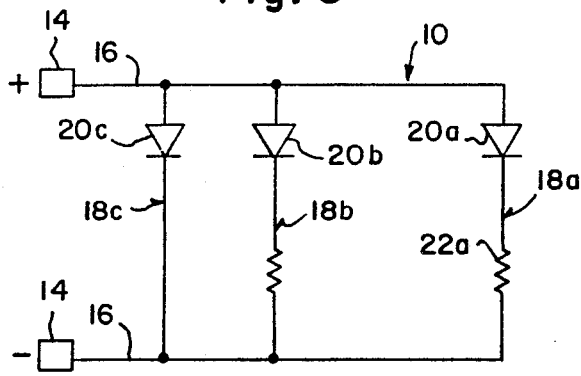
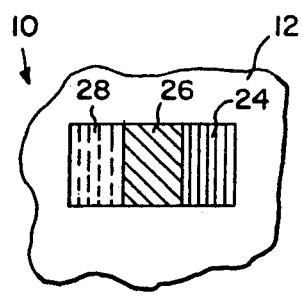
Fig. 5
Fig. 6

BATTERY BUG

BACKGROUND OF THE INVENTION

The instant invention relates generally to battery dischargers and more specifically it relates to an automatic discharging device for a battery which provides three stages for discharging the battery. There are available various conventional battery discharges which do not provide the novel improvements of the invention herein disclosed. A common form of discharge is an appliance that is powered by a battery. However, rechargeable appliances such as hand held vacuum cleaners, flashlights and other types of appliances are almost never fully discharged, but used for only a short duration then placed back into a recharge cradle. Todays model airplanes and remote controlled cars are battery powered. In order for a hobbyist to obtain maximum battery performance he must discharge his batteries using a standard resistor or light bulb. He must also be careful to discharge the battery to a safe level without completely discharging the battery.

SUMMARY OF THE INVENTION

The instant invention is an automatic discharge device which is used on those types of batteries (such as Ni-cad) that develop cell memory, a condition whereby the battery fails to offer a maximum recharge cycle. Ni-cad batteries must be fully cycled in order to obtain maximum cycle between the charged state and discharged state.

A primary object of the present invention is to provide an automatic discharging device for a battery that will overcome the shortcomings of the prior art devices.

Another object is to provide an automatic discharging device for a battery that has two stages for discharging a Ni-cad battery pack.

An additional object is to provide an automatic discharging device for a battery that will automatically shut off once the battery pack voltage reaches a typical predetermined level.

A further object is to provide an automatic discharging device for a battery that is simple and easy to use.

A still further object is to provide an automatic discharging device for a battery that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of an automatic discharging device comprising the invention.

FIG. 2 is a circuit diagram of the basic form of the automatic discharging device.

FIG. 3 is a circuit diagram of a two stage automatic discharging device.

FIG. 4 is a circuit diagram of a modified two stage automatic discharging device, wherein the discharge rates vary differently.

FIG. 5 is a circuit diagram of a modified automatic discharging device wherein the desired discharge level is visually indicated.

FIG. 6 is a top plan view of the device of FIG. 1, with the housing broken away showing the yellow, green and red lamps which indicate the various discharge conditions of the device.

DETAILED DESCRIPTION OF THE PREFERRED EMBODIMENTS

Turning now descriptively to the drawings, in which similar reference characters denote similar elements throughout the several views, FIG. 1 illustrates an automatic discharging device 10 for a battery (not shown) that contains a housing 12 and a pair of alligator clips 14, in which each clip is connected to one end of an electrical wire 16.

FIG. 2 shows an electrical wiring discharge circuit 18 that can be within the housing 12 and connected to the electrical wires 16. A light emitting diode 20 and a resistor 22 is within the electrical wiring discharge circuit 18. When the alligator clips 14 and connected to the terminals of the battery, the light emitting diode 20 will go out when the resistor 22 reaches its desired load indicating that the battery has reached its desired discharged state.

FIGS. 3 and 4 show a two stage system having a first rapid electrical wiring discharge circuit 18a and a second slower electrical wiring discharge circuit 18b. A first light emitting diode 20a and a first resistor 22a are within the first rapid electrical wiring discharge circuit 18a. A second light emitting diode 20b and a second resistor 22b are within the second slower electrical wiring discharge circuit 18b. The first light emitting diode 20a will go out when the first resistor 22 reaches its desired load. The second light emitting diode 20b will go out when the second resistor 22b reaches its desired load indicating that the battery went through two discharging stages to its desired discharged state.

In FIG. 3, the first light emitting diode 20a is at 1.3 volts while the second light emitting diode 20b is at 1.5 volts. The first resistor 22a is at 46 ohms while the second resistor 22b is at 150 ohms. In FIG. 4, the first light emitting diode 20a is at 3 volts while the second light emitting diode 20b is at 2 volts. The first resistor 22a and the second resistor 22b are both at 20 ohms.

FIG. 5 shows a third still slower electrical wiring discharge circuit 18c connected to both the first rapid and the second slower electrical wiring discharge circuits 18a and 18b. A third light emitting diode 20c is within the third still slower electrical wiring discharge circuit 18c which will go on when the second light emitting diode 20b goes out, visually indicating that the battery has reached its desired discharged state.

FIG. 6 shows a red lens 24 over the first light emitting diode 20a, a green lens 26 over the second light emitting diode 20b and a yellow lens 28 over the third light emitting diode 20c in the housing 12. A person using the device 10 can see the various colors when the light emitting diodes are on to indicate the various stages of battery discharge.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic discharging device comprising:
   a) a housing;
   b) a first rapid electrical wiring discharge circuit within said housing;
   c) a second slower electrical wiring discharge circuit connected to said first electrical wiring discharge circuit within said housing;
   d) a first light emitting diode within said first rapid electrical wiring discharge circuit;
   e) a first resistor within said first rapid electrical wiring discharge circuit;
   f) a second light emitting diode within said second slower electrical wiring discharge circuit;
   g) a second resistor within said second slower electrical wiring discharge circuit;
   h) a pair of alligator slips, each said alligator clip connected to one end of both said first rapid and said second slower electrical wiring discharge circuit extending from said housing to connect to the terminals of a battery, whereby said first light emitting diode will go out when said first resistor reaches its desired load, and said second light emitting diode will go out when said second resistor reaches it desired load indicating that the battery went through two discharging stages to its desired discharged state.

2. An automatic discharging device as recited in claim 1, further including:
   a) a third still slower electrical wiring discharge circuit connected to both said first rapid and said second slower electrical wiring discharge circuits;
   b) a third light emitting diode within said third still slower electrical wiring discharge circuit which will go on when said second light emitting diode goes out, visually indicating that the battery has reached its desired discharged state.

3. An automatic discharging device as recited in claim 6, futher including:
   a) a red lens in said housing over said first light emitting diode;
   b) a green lens in said housing over said second light emitting diode; and
   c) a yellow lens in said housing over said third light emitting diode so that a person using said device can see the various colors when said light emitting diodes are on to indicate the various stages of battery discharge.

* * * * *